Oct. 22, 1963 F. G. BUHRENDORF 3,108,260
MAGNETIC RECORDING AND REPRODUCING SYSTEM
Filed Dec. 5, 1957 2 Sheets-Sheet 1

INVENTOR
F. G. BUHRENDORF
BY Kenneth B. Hamlin
ATTORNEY

Oct. 22, 1963 F. G. BUHRENDORF 3,108,260

MAGNETIC RECORDING AND REPRODUCING SYSTEM

Filed Dec. 5, 1957

2 Sheets-Sheet 2

INVENTOR
F. G. BUHRENDORF
BY Kenneth B. Hamlin
ATTORNEY

United States Patent Office 3,108,260
Patented Oct. 22, 1963

3,108,260
MAGNETIC RECORDING AND REPRODUCING SYSTEM

Frederick G. Buhrendorf, Westfield, N.J., assignor to Bell Telephone Laboratories, Incorporated, New York, N.Y., a corporation of New York Filed Dec. 5, 1957, Ser. No. 700,864
6 Claims. (Cl. 340—174.1)

This invention relates to magnetic recording and reproducing systems and more particularly to systems for the recording and reproduction of information by magnetic means.

In data processing systems, the storage of information in binary form is advantageously accomplished by magnetic recording and reproduction methods. Two such methods are in general use known, respectively, as the return-to-zero and the non-return-to-zero systems.

The return-to-zero scheme of recording involves the use of a distinct writing pulse to represent the binary digit 1 by inducing a saturated state magnetization in a discrete cell area of a magnetic surface. The separation between successive, discrete, saturated cells is maintained great enough to allow the flux level in the spaces between the cells to return to a reference value, which value may be established at either a zero or a negative level of saturation. The binary digit 0 may be represented by either of these reference flux levels. If the digit 0 is represented by the negative level of saturation and the flux reference is also chosen to be at negative saturation, then a sequence of successive 0's is recorded without change of flux level during the sequence. In this manner, the absence of a recorded signal is relied upon to represent one binary value. It is apparent that such a scheme involves some degradation of security. Alternatively, the flux reference chosen may be the neutral state of magnetization and the digit 0 represented by a discrete cell area magnetized to negative saturation while the digit 1 is, as before, represented by an area of positive saturation. This return-to-neutral method will provide the security found lacking in the other scheme but imposes the burdensome requirement of establishing a condition of substantially zero magnetization in the recording medium before signals may be recorded. This is required in order that there shall be recorded flux changes of equal magnitude for both zeros and ones so that the same output signal level will obtain for each binary value upon reproduction. This requirement of a neutral erase, effected by a careful demagnetization with a gradually diminishing alternating-current field, is a serious handicap where the magnetic medium is being translated at high velocity.

In the non-return-to-zero or telegraph scheme, a non-discrete pattern of flux levels is established to represent sequences of ones so that throughout the duration of one of such sequences the tape or drum remains in the same condition of saturation. Likewise, throughout the duration of a sequence of zeros, no change in flux level is induced in the recording medium. A change in flux level will be induced only to indicate a change in the sequence of recorded digits. This mode of operation is particularly subject to errors arising from the imperfections which are commonly encountered in the magnetic surface of the recording medium because of the absence of any affirmative indication accompanying the recording of a sequence of digits of either binary value.

Another approach to the magnetic recording problem encompassed by the non-return-to-zero system involves switching the state of magnetic saturation whenever it is desired to record a one and leaving the last-established saturation state unchanged to indicate a zero. This system, in common with those above noted, also depends upon the absence of a recorded flux change to indicate one of the binary digits and consequently encounters similar objections from the standpoint of reliability.

It is accordingly and object of the present invention to provide a new and improved means for and method of magnetically recording and reproducing information.

It is another object of the present invention to provide an improved method of and means for magnetically recording and reproducing binary information in a form wherein each binary value is individually and distinctively represented.

It is another object of the present invention to improve the reliability of magnetically recording and reproducing binary information.

It is a further object of the present invention to provide a magnetic recording and reproducing system wherein the requirement for neutral erase is eliminated.

These and other objects are attained in one specific illustrative embodiment of the present invention wherein the recording of binary information in an information storage area of a movable magnetizable medium is advantageously accomplished by passing a current through a magnetic head in close proximity with the medium to establish a magnetic saturation in a first portion of the storage area to represent one binary value and to pass a current of said same magnitude and direction through the magnetic head to establish a magnetic saturation in a second portion of the storage area to represent the other binary value, and wherein the recorded binary information is read from the magnetizable medium by determining the sense of the gradient magnetic flux density in a portion of the storage area intermediate the first and second portions thereof.

Accordingly, it is a feature of the present invention to record binary information in an information storage area of a magnetizable medium by the relative position of a magnetic spot in the storage area.

It is a feature of the present invention to read binary information recorded in an information storage area of a magnetizable medium by sensing the relative position of a magnetic spot recorded in the storage area.

It is another feature of the present invention to unidirectionally polarize discrete areas of a magnetically retentive surface to record both values of a binary informatioin bit.

It is a feature of the present invention to sense the flux gradient adjoining each unidirectionally polarized area of a magnetically retentive surface to determine the binary value of the information bit recorded therein.

It is also a feature of the present invention to record both values of a binary information bit in a magnetizable medium with a unidirectional flux source.

It is a feature of the present invention to induce a magnetic condition in one portion of an information storage area to represent a binary 0, to induce a like magnetic condition in a second portion of sai darea to represent a binary 1, and to read the binary value recorded in said area by sensing the magnetic condition of a portion of said area intermediate said first and said second portions.

The foregoing and other objects and features of the present invention will be more readily understood from the following description of an illustrative embodiment thereof when read with reference to the accompanying drawing in which.

Figure 1:
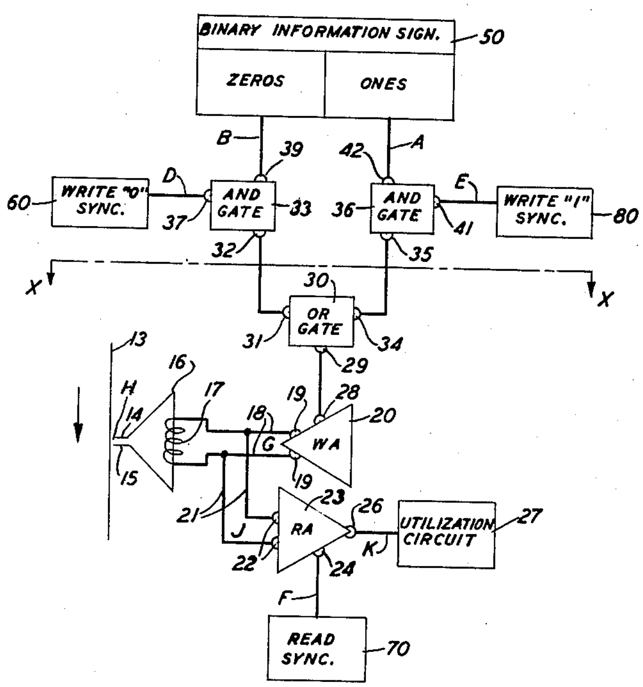
FIG. 1 shows in schematic form an illustrative embodiment of the magnetic recording and reproducing system of the present invention.

In the drawing, FIG. 1 is a schematic representation of one illustrative embodiment of the present invention for magnetically recording and reproducing binary information which provides both a distinctive magnetic condition in the surface of a movable record member for each value of a binary information bit during the writing operation, and an output signal of correspondingly distinct polarity to a utilization circuit during the reading operation.

As shown in FIG. 1, a magnetizable member 13, which advantageously may be provided by the peripheral surface of a magnetic drum or tape, is caused to move successively past polepieces 14 and 15 of magnetic head 16 by suitable means, not shown. Winding 17 of head 16 is coupled via leads 18 to the output terminals 19 of writing amplifier 20 and via leads 21 to the input terminals 22 of reading amplifier 23. Control terminal 24 of amplifier 23 is coupled to read sync pulse source 70 and output terminal 26 of amplifier 23 is connected to utilization circuit 27. Control terminal 28 of writing amplifier 20 is connected to output terminal 29 of OR gate 30. Input terminal 31 of OR gate 30 is connected to output terminal 32 of AND gate 33 and input terminal 34 of OR gate 30 is connected to output terminal 35 of AND gate 36. Input terminal 37 of AND gate 33 is connected to the write 0 sync pulse source 60 and input terminal 39 of AND gate 33 is connected to the zero digit output of binary information signal source 50. Input terminal 41 of AND gate 36 is connected to write 1 sync pulse source 80 and input terminal 42 of AND gate 36 is connected to the one digit output of binary information source 50.

Preliminary to the recording of the binary information signals, a uniform reference state of magnetization should be established in the record member 13. This uniform state may be advantageously established at any value of magnetization other than that used to record the binary information signals. The magnetizable member 13 may be uniformly preconditioned through the use of any of the well-known erasing techniques such as bulk erase to obtain neutral magnetization or by providing a separate direct-current erase head, not shown, to saturate member 13 before exposure to magnetic head 16. Alternatively, the uniform conditioning of the record member 13 to the reference saturation level may be accomplished incident to the binary information recording operation itself by any of the well-known methods of applying a biasing flux to the same magnetic head 16 to which the writing pulses are applied. One such technique is illustrated in C. N. Hickman Patent 2,003,968, of June 4, 1935.

Figure 3:
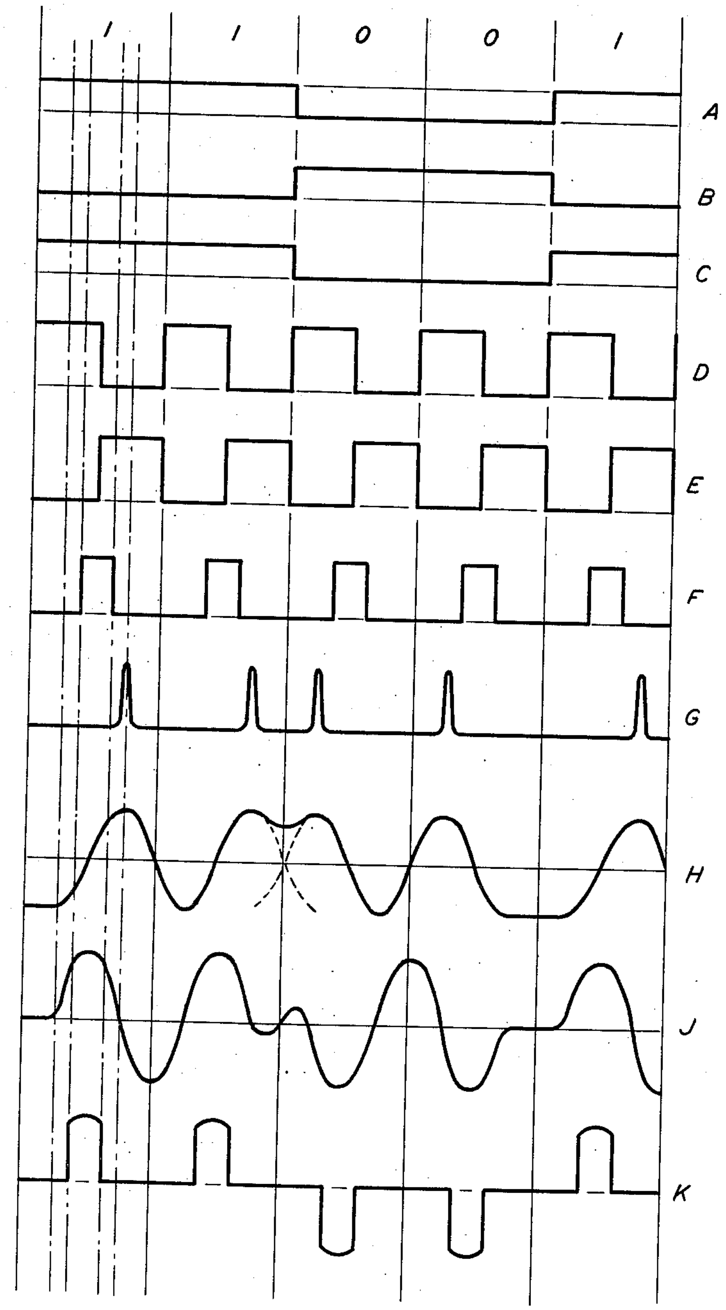
FIG. 3 shows the waveforms obtained at designated points in the embodiments shown in FIGS. 1 and 2.

The operation of the apparatus of FIG. 1 may be more clearly understood by referring now to FIG. 3 wherein the time relationship for the waveforms occurring at the designated points of FIG. 1 during the operation of the system is shown. Considering first the recording operation, the digit 1 signals from binary information source 50 are shown at A in FIG. 3 and the digit 0 signals from binary information source 50 are shown at B in FIG. 3. During the five consecutive digit intervals therein shown, information source 50 is represented as supplying the data sequence 11001. No particular significance attaches to the designated sequence other than the obvious fact that this short train represents the general case wherein all possible combinations of adjacent digits occur. The waveforms occurring at the designated points of FIG. 1 during the first digit interval are shown in the first column of FIG. 3. A digit 1 signal, shown at A, is applied to terminal 42 of AND gate 36; however, during the first portion of this interval no write 1 synchronizing pulse, shown at E, is applied to terminal 41 of AND gate 36 and the 1 signal is not effective to unblock the gate. During the second portion of the first digit interval, the write 1 synchronizing pulse E unblocks AND gate 36 and control terminal 28 of writing amplifier 20 is energized via the operating path provided through OR gate 30. Writing amplifier 20 thereupon energizes head 16 by supplying the unidirectional writing current pulse, shown at G, to winding 17 via leads 18. The resultant magnetic flux pattern produced in surface 13 by the writing current pulse is shown in FIG. 3 at H. The abscissa of the flux waveforms, shown at H, is equally indicative of time as well as space configuration.

During the second digit interval, a digit 1 signal is shown in the second column of FIG. 3 at A and the corresponding write 1 synchronzing pulse, writing current pulse and flux pattern are shown below at E, G, and H, respectively.

During the third digit interval, a binary 0 signal is supplied by binary information source 50 at B and in the first half of this interval a write 0 pulse is provided at D by write sync pulse source 60. The simultaneous presence of signals at terminals 37 and 39 of AND gate 33 unblocks AND gate 33 and an operating path is created via OR gate 30 to energize control terminal 28 of writing amplifier 20. Writing amplifier 20 thereupon energizes head 16 by supplying to winding 17 a writing current pulse shown at G of FIG. 3 during the first half of the digit interval of the same magnitude and sense as was supplied during the second half of each of the first and second digit intervals. The write 1 sync pulse which occurs during the second half of the third digit interval is blocked at AND gate 36 because no digit 1 signal is supplied at this time by information source 50.

During the fourth digit interval a digit 0 signal is again supplied by source 50 at B and the waveforms occurring are shown in the fourth column of FIG. 3.

During the fifth digit interval a digit 1 signal is provided by information source 50 at A and the recording takes place as previously described in connection with the first and second digit intervals. Corresponding waveforms are shown in the fifth column of FIG. 3.

Referring now to the flux pattern shown at H in FIG. 3, it is seen that the sense of the gradient flux in the central portion of each digit interval is determined by whether a one or a zero has been recorded during the digit interval, i.e., whether the peaks of the magnetization pattern recorded by the undirectional energization of the recording head by the writing current pulses at G are positioned in the first or in the second half of the digit interval. Since, as has been noted above, the abscissa of the flux pattern shown at H represents both the time and space configuration of the flux density induced in surface 13, a pulse G recorded earlier in the digit interval will appear as a magnetization peak, or spot, in the leading portion of the cell area and a pulse G recorded later in the digit interval will appear as such a peak or spot positioned in the lagging portion of the cell area.

Figure 2:
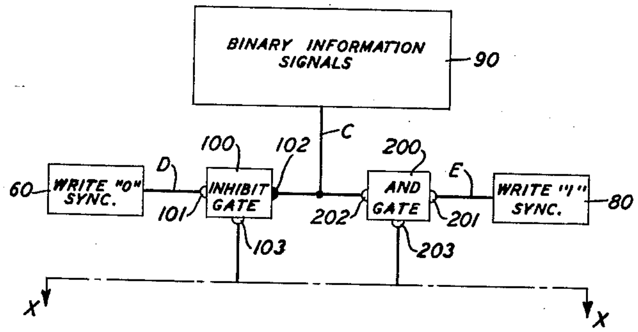
FIG. 2 shows in schematic form another illustrative embodiment of the invention for magnetically recording and reproducing information.

FIG. 2 shows an alternative arrangement suitable for recording information provided by a single channel binary signal source such as source 90. That portion of the circuitry of FIG. 1 appearing below section line X—X is common to the apparatus of FIG. 2. Signals from source 90 are coupled to inhibit input terminal 102 of inhibit gate 100 and to input terminal 202 of AND gate 200. The write 0 sync pulse shown at D is coupled to input terminal 101 of inhibit gate 100 and the output terminal 103 of gate 100 is connected to input terminal 31 of OR gate 30 shown below the section line X—X of FIG. 1. The write 1 sync pulse shown at E is coupled to input terminal 201 of AND gate 200 and the output terminal 203 of AND gate 200 is connected to input terminal 34 of OR gate 30 shown below the section line X—X of FIG. 1. The remainder of the circuitry proceeding from the output terminal of OR gate 30 is the same as in FIG. 1.

In operation, during the recording of the binary signal sequence 11001 supplied by source 90, the system of FIG. 2 functions in the following manner. During the first digit interval shown in the first column of FIG. 3, source 90 applies a digit 1 pulse shown at C to the inhibit terminal 102 of gate 100 and the AND gate 200.

During the first half of this digit interval the write 0 sync pulse applied to terminal 101 is not effective to unblock gate 100 because of the simultaneous presence of the digit 1 pulse on the inhibit erminal 102 of gate 100. The digit 1 pulse present on terminal 202 of AND gate 200 is not effective to unblock AND gate 200 because no write 1 sync pulse is furnished at terminal 201 of AND gate 200. Thus, the writing amplifier is not energized. However, during the second half of this digit interval, write 1 sync pulse E is applied to terminal 201 of AND gate 200 and the simultaneous presence of the digit 1 signal shown at C at terminal 202 unblocks AND gate 200 thereby providing for the energization of writing amplifier 20 as discussed above in connection with FIG. 1. The circuit functions similarly during the second and fifth digit intervals shown in FIG. 3.

During the third digit interval source 90 represents the digit 0 by the absence of any pulse at C. The write 0 sync pulse D produced during the first portion of the digit interval is applied to terminal 101 and passes through gate 100 because no signal is applied to inhibit terminal 102 thereby providing for the energization of writing amplifier 20 as priorly shown. Amplifier 20 applies the pulse of writing current shown in the third column of FIG. 3 at G to the magnetic head winding 17. During the second portion of the digit interval the write 1 sync pulse E is blocked by AND gate 200. During the fourth digit interval the response of the system is a repetition of that occurring in the third digit interval.

To reproduce the signals which have been recorded by either of the foregoing processes, the member 13 is advantageously driven past the magnetic head 16 which functions as a pick-up device during the reading operation. The reading amplifier 23 is activated by the read sync pulse shown at F in FIG. 3 for the brief period therein indicated during each of the digit intervals. Synchronizing the movement of the central portion of the magnetic cell past the reading head with the occurrence of the read sync pulse may advantageously be achieved by any of the well-known indexing devices current in the art. For example, a separate timing track not shown in the drawing may be recorded on surface 13 simultaneously with the operation of the binary information source during the data writing phase by a recording pulse derived from the master clock used to establish the repetition rate of the binary information source. Subsequent location of each digit interval on the information track during the reading operation is thereby readily determinable by reference to the timing track. As the magnetized surface pattern shown at H is moved successively past the poles 14 and 15 of magnetic head 16, the voltage shown at J in FIG. 3 is induced in winding 17 in accordance with the time rate of change of the flux H. Since the read sync pulse only gates the reading amplifier when the particular flux condition corresponding to the center of the digit interval passes the magnetic head, the polarity of the voltage as shown at K in FIG. 3 applied to the utilization device 27 will reflect the sense of the magnetic gradient of only this intermediate flux. Thus where a recorded maximum of flux density follows the reading interval, the sense of the gradient flux density swept by the magnetic head is opposite to that occurring when a recorded maximum of flux density leads the reading interval. Accordingly a decreasing magnetic flux density resulting from the recording of a binary 0 as described above will provide a negative output pulse and the increasing magnetic flux density resulting from the recording of a binary 1 as described above will provide a positive out pulse. These pulses are shown at K in FIG. 3 for the respective digit intervals.

The synchronizing pulses shown at D, E and F in FIG. 3 may advantageously be supplied by any of the well-known pulse generating devices known in the art. For example, the synchronizing circuit shown in Patent 3,007,145, issued to O. J. Murphy on October 31, 1961, may advantageously be utilized to supply the write 0, write 1 and read synchronizing pulses provided by write 0 sync pulse source 60, write 1 sync pulse source 80, and read sync pulse source 70, respectively, in the phase relationship shown in FIG. 3.

It is to be understood that the above-described arrangements are illustrative of the application of the principles of the invention. Numerous other arrangements may be devised by those skilled in the art without departing from the spirit and scope of the invention.

What is claimed is:

1. A recording apparatus comprising a source of binary information signals, a magnetic recording head, a magnetizable surface medium movable with respect to said head, indexing means defining a plurality of areas on said surface, means jointly responsive to said indexing means and one value of said binary information signals for energizing said head only so long as at least one of said areas approaches closer to said head, and means jointly responsive to said indexing means and the other value of said binary signals for energizing said head only so long as at least another of said areas passes away from said head.

2. A system for magnetic recording comprising a source of binary signals, a source of reference pulses, a source of first synchronizing pulses, each of said first synchronizing pulses leading said reference pulses by a predetermined amount, a source of second synchronizing pulses, each of said second synchronizing pulses lagging said reference pulses by a predetermined amount, a movable magnetic medium having a plurality of magnetizable surface areas, recording means operable to induce a unidirectionally polarized magnetization in said medium, means jointly responsive to said first synchronizing pulses and to binary signals of one value to energize said recording means, said unidirectionally polarized magnetization being induced in a leading portion of at least one of said plurality of surface areas to represent said one value of binary signals, and means jointly responsive to said second synchronizing pulses and to binary signals of the other value to energize said recording means, said unidirectionally polarized magnetization being induced in a lagging portion of at least another one of said plurality of surface areas to represent binary signals of said other value.

3. A system in accordance with claim 2 further comprising reading means responsive to said reference pulses for determining the magnetic condition of each of said areas.

4. A magnetic recording system comprising a signal source supplying binary information signal bits at predetermined intervals, a source of first synchronizing pulses, each of said pulses occurring during one-half of a respective one of said intervals, a source of second synchronizing pulses, each of said second pulses occurring during the other half of a respective one of said intervals, a continuously moving surface of magnetizable material having a plurality of discrete recording areas magnetically polarized in the direction of motion, writing means selectively operable to magnetically polarize said areas only oppositely to said direction, means responsive to said first synchronizing pulses and to binary signal bits of one value from said signal source to operate said writing means, and means responsive to said second synchronizing pulses and to binary signal bits of the other value from said binary signal source to operate said writing means.

5. A magnetic recording arrangement comprising a magnetizable medium having a plurality of information storage areas, recording means for recording binary information manifestations in said areas, means producing relative motion between said medium and said recording means, a source of binary signals, first single pulse means connected to said source and responsive to binary signals of one value for supplying an energizing pulse of a predetermined polarity to said recording means to record said value completely in one portion of any of said areas, and second single pulse means connected to said source and responsive to binary signals of the other value for supplying an energizing pulse of said predetermined polarity to said recording means to record said other value completely in a second portion of any of said areas.

6. The method of recording binary information according to the position of a single type of magnetic spot in a magnetizable medium having a reference magnetization established therein comprising defining first and second portions of said medium, establishing only said single type of spot of a predetermined polarity of magnetization distinct from said reference magnetization in said first portion completely to represent one value of said binary information, and establishing only said single type of spot of said predetermined polarity of magnetization in said second portion completely to represent the other value of said binary information.

References Cited in the file of this patent

UNITED STATES PATENTS

| | | |
|---|---|---|
| 2,719,964 | McGuigan | Oct. 4, 1955 |
| 2,729,214 | Brockhuysen | Jan. 3, 1956 |
| 2,729,809 | Hester | Jan. 3, 1956 |
| 2,734,186 | Williams | Feb. 7, 1956 |
| 2,764,463 | Lubkin | Sept. 25, 1956 |
| 2,813,259 | Burkhart | Nov. 12, 1957 |
| 2,882,518 | Buhrendorf | Apr. 14, 1959 |
| 2,887,674 | Greene | May 19, 1959 |